United States Patent [19]

Fischer et al.

[11] Patent Number: 5,289,583
[45] Date of Patent: Feb. 22, 1994

[54] BUS MASTER WITH ANTILOCKUP AND NO IDLE BUS CYCLES

[75] Inventors: Lisa L. Fischer, Boulder, Colo.; Stephen D. Hanna, Tucson, Ariz.

[73] Assignee: International Business Machines Corporation, Armonk, N.Y.

[21] Appl. No.: 600,337

[22] Filed: Oct. 19, 1990

[51] Int. Cl.⁵ .................................. G06F 13/14
[52] U.S. Cl. ........................... 395/325; 395/725; 364/242.6; 364/DIG. 1; 364/937.01; 364/942.4; 364/DIG. 2
[58] Field of Search ............... 395/325, 725; 364/242.6, 242.91, 242.92, DIG. 1, 942.4, 947.4, DIG. 2; 371/57.1

[56] References Cited

U.S. PATENT DOCUMENTS

| | | |
|---|---|---|
| 3,905,025 | 9/1975 | Davis et al. ................ 395/725 |
| 4,521,848 | 6/1985 | Bruce et al. ................ 395/575 |
| 4,639,859 | 1/1987 | Ott .............................. 395/325 |
| 4,661,905 | 4/1987 | Bomba et al. .............. 395/325 |
| 4,779,195 | 10/1988 | James ........................ 395/275 |
| 5,072,365 | 12/1991 | Burgess et al. ............. 395/725 |
| 5,101,479 | 3/1992 | Baker et al. ................ 395/325 |
| 5,140,680 | 8/1992 | Best ............................. 395/325 |

Primary Examiner—Michael R. Fleming
Assistant Examiner—Glenn A. Auve

[57] ABSTRACT

Bus master for use in computer system includes logic for determining the number of words remaining to be transferred in a DMA operation to supply signals to permit arbitration to start for the next DMA request, thereby avoiding an idle cycle. A timeout state machine is also included to prevent the bus master state machine from hanging in a state with no exit. Errors can be masked to permit analysis of system problems.

4 Claims, 4 Drawing Sheets

|     |          | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|-----|----------|---|---|---|---|---|---|---|---|---|----|----|----|----|----|----|----|----|----|----|----|----|----|----|----|
| S1  | STATE A  | 1 | 1 |   |   |   |   |   |   |   |    |    |    |    |    | 1  | 1  |    |    |    |    |    |    |    |    |
| S2  | STATE B  |   |   | 1 | 1 |   |   |   |   |   |    |    |    |    |    |    | 1  | 1  |    |    |    |    |    |    |    |
| S3  | STATE C  |   |   |   |   |   |   |   |   |   |    |    |    |    |    |    |    |    |    |    |    |    |    |    |    |
| S4  | STATE D  |   |   |   |   |   |   |   |   |   |    |    |    |    |    |    |    |    |    |    |    |    |    |    |    |
| S5  | STATE E  |   |   |   |   |   |   |   |   |   |    | 1  | 1  |    |    |    |    |    |    |    |    | 1  | 1  |    |    |
| S6  | STATE F  |   |   |   |   |   |   |   |   |   |    |    |    | 1  | 1  |    |    |    |    |    |    |    |    | 1  | 1  |
| S7  | STATE G  |   |   |   |   |   |   |   |   |   |    |    |    |    |    |    |    |    |    |    |    |    |    |    |    |
| S8  | STATE H  |   |   |   |   |   |   |   |   |   |    |    |    |    |    |    |    |    |    |    |    |    |    |    |    |
| S9  | STATE J  |   |   |   |   |   |   |   |   | 1 |    |    |    |    |    |    |    |    |    |    |    |    |    |    |    |
| S10 | STATE K  |   |   |   |   |   | 1 | 1 |   | 1 | 1  |    |    |    |    |    |    |    |    | 1  | 1  |    |    |    |    |
| S11 | STATE L  |   |   |   |   |   |   | 1 |   |   |    |    |    |    |    |    |    |    |    |    |    |    |    |    |    |
| E1  | DMAREQ   |   | 0 |   | 0 | 0 |   |   |   |   | 0  |    | 0  |    | 1  |    | 1  |    | 1  |    | 1  |    | 1  |    |    |
| E2  | MASKDMS  |   | 0 |   | 0 |   | 0 | 0 | 0 | 0 |    | 1  | 1  |    | 1  |    | 1  |    | 1  |    | 1  |    | 1  |    | 1  |
| E3  | MORE     |   |   |   |   | 0 | 0 |   | 1 |   | 0  | 0  | 0  | 0  |    |    |    |    |    |    |    |    |    |    |    |
| E4  | PBDVAL   |   |   |   |   | 1 | 1 |   |   | 0 |    |    |    |    |    |    |    |    |    |    |    |    |    |    |    |
| E5  | PBHOLD   |   |   |   |   |   |   |   | 0 | 0 | 0  | 0  |    |    |    |    |    |    |    |    |    |    |    |    |    |
| E6  | READY    |   |   |   |   |   |   | 1 | 1 |   |    |    |    |    |    |    |    |    |    |    |    |    |    |    |    |
| E7  | START    | 0 |   | 0 |   | 0 |   |   |   |   | 0  |    | 0  |    | 1  | 1  | 1  | 1  | 1  | 1  |    |    |    |    |    |
| E8  | STRBUSY  |   |   |   |   |   |   |   |   |   |    | 1  | 1  | 1  | 1  |    |    |    |    |    | 0  | 0  | 0  | 0  |    |
| E9  | STRLOAD  |   |   |   |   |   |   |   |   |   |    |    |    |    |    |    |    |    |    |    |    |    |    |    |    |
| A1  | SELECT A | X | X | X | X | X | X | X | X | X |    |    |    |    |    |    |    |    |    |    |    |    |    |    |    |
| A2  | SELECT B |   |   |   |   |   |   |   |   |   | X  | X  | X  | X  |    |    |    |    |    |    |    |    |    |    |    |
| A3  | SELECT C |   |   |   |   |   |   |   |   |   |    |    |    |    |    | X  | X  | X  | X  | X  | X  |    |    |    |    |
| A4  | SELECT D |   |   |   |   |   |   |   |   |   |    |    |    |    |    |    |    |    |    |    |    | X  | X  | X  | X  |
| A5  | SELECT E |   |   |   |   |   |   |   |   |   |    |    |    |    |    |    |    |    |    |    |    |    |    |    |    |
| A6  | SELECT F |   |   |   |   |   |   |   |   |   |    |    |    |    |    |    |    |    |    |    |    |    |    |    |    |
| A7  | SELECT G |   |   |   |   |   |   |   |   |   |    |    |    |    |    |    |    |    |    |    |    |    |    |    |    |
| A8  | SELECT H |   |   |   |   |   |   |   |   |   |    |    |    |    |    |    |    |    |    |    |    |    |    |    |    |
| A9  | SELECT J |   |   |   |   |   |   |   |   |   |    |    |    |    |    |    |    |    |    |    |    |    |    |    |    |
| A10 | SELECT K |   |   |   |   |   |   |   |   |   |    |    |    |    |    |    |    |    |    |    |    |    |    |    |    |
| A11 | SELECT L |   |   |   |   |   |   |   |   |   |    |    |    |    |    |    |    |    |    |    |    |    |    |    |    |
| A12 | P-BUS ADDR |   |   |   |   |   |   |   |   |   |    |    |    |    |    | X  | X  | X  | X  | X  | X  | X  | X  | X  |    |
| A13 | P-BUS DATA |   |   |   |   |   |   |   |   |   |    |    |    |    |    |    |    |    |    |    |    |    |    |    |    |
| A14 | PBDVAL   |   |   |   |   |   |   |   |   |   |    |    |    |    |    |    | X  | X  | X  | X  | X  | X  | X  | X  | X  |
| A15 | STRLOAD  |   |   |   |   |   |   |   |   |   |    |    |    |    |    |    | X  | X  | X  | X  | X  | X  | X  | X  | X  |
| A16 | DMAREQ   |   |   |   |   |   |   |   |   |   |    |    |    |    |    |    | X  | X  | X  | X  | X  | X  | X  | X  | X  |

FIG. 1A

|     |           | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
|-----|-----------|----|----|----|----|----|----|----|----|----|----|----|----|----|----|----|----|----|----|----|----|----|----|----|----|----|----|
| S1  | STATE A   |    |    |    |    |    |    |    |    |    |    |    |    |    |    |    |    |    |    |    |    |    |    |    |    |    |    |
| S2  | STATE B   |    |    |    |    |    |    |    |    |    |    |    |    |    |    |    |    |    |    |    |    |    |    |    |    |    |    |
| S3  | STATE C   | 1  |    |    |    |    |    |    | 1  |    |    |    |    |    |    |    | 1  |    |    |    |    |    |    |    |    |    |    |
| S4  | STATE D   |    | 1  |    |    |    |    |    |    | 1  |    |    |    |    |    |    |    | 1  |    |    |    |    |    |    |    |    |    |
| S5  | STATE E   |    |    | 1  | 1  |    |    |    |    |    | 1  | 1  |    |    |    |    |    |    |    |    |    |    |    |    |    |    |    |
| S6  | STATE F   |    |    |    |    | 1  | 1  |    |    |    |    |    |    | 1  | 1  |    |    |    |    |    |    |    |    |    |    |    |    |
| S7  | STATE G   |    |    |    |    |    |    | 1  |    |    |    |    |    | 1  |    |    |    |    |    |    |    |    |    |    |    |    |    |
| S8  | STATE H   |    |    |    |    |    |    |    | 1  |    |    |    |    |    | 1  |    |    |    |    |    |    |    |    |    |    |    |    |
| S9  | STATE J   |    |    |    |    |    |    |    |    |    |    |    |    |    |    |    |    |    | 1  |    | 1  |    |    |    |    |    |    |
| S10 | STATE K   |    |    |    |    |    |    |    |    |    |    |    |    |    |    |    |    |    |    | 1  |    | 1  | 1  |    |    |    |    |
| S11 | STATE L   |    |    |    |    |    |    |    |    |    |    |    |    |    |    |    |    |    |    |    |    | 1  |    | 1  | 1  |    |    |
| E1  | DMAREQ    |    |    |    |    |    |    |    |    |    |    |    |    |    |    |    |    |    |    |    |    |    |    |    |    |    |    |
| E2  | MASKDMS   |    |    |    |    |    |    |    |    |    |    |    |    |    |    |    |    |    |    |    |    | 1  | 1  | 1  |    |    |    |
| E3  | MORE      |    |    | 1  |    | 1  |    |    |    |    | 1  | 1  |    |    |    |    |    |    | 1  |    |    |    | 1  |    | 1  |    |    |
| E4  | PBDVAL    |    |    |    |    |    |    |    |    |    |    |    |    |    |    |    |    |    |    |    |    |    |    |    | 1  |    |    |
| E5  | PBHOLD    |    |    |    |    |    |    |    |    |    |    |    |    |    |    |    |    |    | 1  | 1  | 1  |    |    |    |    |    |    |
| E6  | READY     | 1  | 1  | 1  | 1  | 1  | 1  | 1  | 1  | 1  | 0  | 0  | 0  | 0  | 0  | 0  | 0  | 0  |    |    | 1  | 1  |    | 1  | 1  | 0  | 0  |
| E7  | START     |    |    |    |    |    |    |    |    |    |    |    |    |    |    |    |    |    |    |    |    |    |    |    |    |    |    |
| E8  | STRBUSY   |    |    | 1  |    | 1  |    |    |    |    |    | 1  | 1  |    |    |    |    |    |    |    |    |    |    |    |    |    |    |
| E9  | STRLOAD   | 0  | 0  |    |    |    |    |    | 0  | 0  |    |    |    |    |    |    |    | 1  | 1  |    |    |    |    |    |    |    |    |
| A1  | SELECT A  |    |    |    |    |    |    |    |    |    |    |    |    |    |    |    |    |    |    |    |    |    |    |    |    |    |    |
| A2  | SELECT B  |    |    |    |    |    |    |    |    |    |    |    |    |    |    |    |    |    |    |    |    |    |    |    |    |    |    |
| A3  | SELECT C  |    |    |    |    |    |    |    |    |    |    |    |    |    |    |    |    |    |    |    |    |    |    |    |    |    |    |
| A4  | SELECT D  |    |    |    |    |    |    |    |    |    |    |    |    |    |    |    |    |    |    |    |    |    |    |    |    |    |    |
| A5  | SELECT E  | X  | X  |    |    |    |    |    |    |    |    |    |    |    |    |    |    |    |    |    |    |    |    |    |    |    |    |
| A6  | SELECT F  |    |    | X  | X  | X  | X  | X  | X  |    |    |    |    |    |    |    |    |    |    |    |    |    |    |    |    |    |    |
| A7  | SELECT G  |    |    |    |    |    |    |    |    | X  | X  |    |    |    |    |    |    |    |    |    |    |    |    |    |    |    |    |
| A8  | SELECT H  |    |    |    |    |    |    |    |    |    |    | X  | X  | X  | X  | X  | X  |    |    |    |    |    |    |    |    |    |    |
| A9  | SELECT J  |    |    |    |    |    |    |    |    |    |    |    |    |    |    |    |    | X  | X  |    |    |    |    |    |    |    |    |
| A10 | SELECT K  |    |    |    |    |    |    |    |    |    |    |    |    |    |    |    |    |    |    | X  | X  | X  | X  | X  | X  |    |    |
| A11 | SELECT L  |    |    |    |    |    |    |    |    |    |    |    |    |    |    |    |    |    |    |    |    |    |    |    |    | X  | X  |
| A12 | P-BUS ADDR|    |    |    |    |    |    |    |    |    |    |    |    |    |    |    |    |    |    |    |    |    |    |    |    |    |    |
| A13 | P-BUS DATA| X  | X  | X  | X  | X  | X  | X  |    |    |    |    |    |    |    |    |    |    |    |    |    |    |    |    |    |    |    |
| A14 | PBDVAL    |    | X  | X  | X  | X  | X  | X  | X  |    |    |    |    |    |    |    |    |    |    |    |    |    |    |    |    |    |    |
| A17 | PBHOLD    | Z  | Z  | Z  | Z  | Z  | Z  | Z  |    |    |    |    |    |    |    |    |    |    |    |    |    |    |    |    |    |    |    |
| A16 | DMAREQ    | X  | X  | X  | X  | X  | X  | X  | X  | X  | X  | X  | X  | X  | X  | X  | X  | Z  | Z  | T  | T  | T  | T  | T  | T  | Z  | Z  |

FIG. 1B

|  |  | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| S1 | STATE A | 1 |  |  |  |  | 1 | 1 |  |  |  |  |  |  |  |  |  |  |  |  |  |
| S2 | STATE B |  | 1 |  |  |  |  |  | 1 | 1 |  |  |  |  |  |  |  |  |  |  |  |
| S3 | STATE C |  |  | 1 |  |  |  |  |  |  | 1 |  | 1 | 1 |  | 1 | 1 |  |  |  |  |
| S4 | STATE D |  |  |  |  |  |  |  |  |  |  |  |  |  |  |  |  |  | 1 |  |  |
| S5 | STATE E |  |  |  | 1 |  |  |  |  |  |  | 1 |  |  |  |  |  | 1 |  |  |  |
| S6 | STATE F |  |  |  |  | 1 |  |  |  |  |  |  |  |  | 1 |  |  |  |  | 1 | 1 |
| E1 | DMAREQ | 0 | 0 | 0 | 1 |  | 0 | 0 | 1 | 1 | 1 | 0 | 1 | 1 |  | 1 | 1 |  |  |  |  |
| E2 | MYDMA |  |  |  |  |  |  |  |  |  |  |  | 1 | 1 |  | 0 | 0 |  |  |  |  |
| E3 | PBDVAL |  |  |  |  |  |  |  |  |  |  |  |  |  |  | 1 |  |  |  | 0 |  |
| E4 | PBDREQX | 0 | 0 |  |  |  | 1 | 1 |  |  |  |  |  |  |  |  |  |  |  |  |  |
| E5 | PBHOLD |  |  |  | 0 | 0 |  |  |  |  | 0 |  |  |  | 1 |  |  | 1 |  | 1 | 1 |
| E6 | STRBUSY |  |  |  |  |  |  |  |  |  |  |  |  |  | 0 |  |  |  |  |  | 1 |
| E7 | STRREQ |  |  |  |  |  |  |  |  |  | 0 | 1 |  |  | 1 |  |  |  |  |  |  |
| E8 | STRREQ2 |  |  |  |  |  |  |  |  |  | 0 |  | 1 |  |  | 1 |  |  |  |  |  |
| A1 | SELECT A | X | X | X | X |  |  |  |  |  |  |  |  |  |  |  |  |  |  |  |  |
| A2 | SELECT B |  |  |  |  |  | X | X |  |  |  |  |  |  |  |  |  |  |  |  |  |
| A3 | SELECT C |  |  |  |  |  |  |  | X | X | X |  |  |  |  |  |  |  |  |  |  |
| A4 | SELECT D |  |  |  |  |  |  |  |  |  |  |  | X | X | X |  |  |  |  |  |  |
| A5 | SELECT E |  |  |  |  |  |  |  |  |  |  |  |  |  |  |  | X | X | X |  |  |
| A6 | SELECT F |  |  |  |  |  |  |  |  |  |  |  |  |  |  |  |  |  | X | X | X |
| A7 | LOAD CTR | X | X | X | X |  |  |  |  |  |  |  | X | X | X | X | X |  |  |  |  |
| A8 | DECR CTR |  |  |  |  |  | X | X | X | X | X |  |  |  |  |  |  |  | X | X | X |

FIG. 3

BUS MASTER WITH ANTILOCKUP AND NO IDLE BUS CYCLES

DOCUMENTS INCORPORATED BY REFERENCE

The following patent applications, all assigned to the common assignee of this application, are incorporated by reference for the reason given:

Ser. No. 473,014, filed Jan. 31, 1990, PROGRAMMABLE STAR BUS ARBITRATION SCHEME as showing an arbitration system for determining which of several contending bus masters will gain access to a system resource, usually a bus;

Ser. No. 591,355, filed Oct. 1, 1990, CHAINED DMA DEVICES FOR CROSSING COMMON BUSES as showing the communication between DMA devices on the same bus;

Ser. No. 591,354, filed Oct. 1, 1990, TESSELLATING AND QUADDING PELS DURING IMAGE TRANSFER for showing the manner by which tessellation is accomplished; and Ser. No. 590,118, filed Sep. 28, 1990, FAST ASYNCHRONOUS RESOURCE MASTER-SLAVE COMBINATION for showing the signals used for fast termination of resource access without creating timing anomalies.

BACKGROUND AND SUMMARY OF THE INVENTION

This invention relates to system resource controllers and particularly to bus masters accessing system resources via a bus.

Large data processing systems include many resources and many demands on the resources. The number and diversity of the resources and the devices that access the resources are so great that the system processor cannot efficiently control the interaction among all the resources and devices. Direct memory access was developed to permit memory accesses by devices without requiring processor intervention. DMA controllers are commercially available and are programmable so that their operation can be tailored to a particular system.

When several devices contend for access to the system resources, usually the buses connecting devices and resources, the access is granted one of the contenders on the basis of arbitration. Devices are assigned priorities so that the faster devices can transfer the data that accumulates at a high rate.

When one device attains control of the resource, it may make several data transfers. When finished, it relinquishes control of the resource. Then arbitration for access by another device can be initiated.

The time for making data transfers is now measured in nanoseconds so the systems can operate at fast rates. Even at high speeds, it is desirable to make the system operation as efficient as possible.

When a device releases a resource, the arbitration for the next access takes a cycle during which the resource is idle.

Sometimes a device will hang up because of a malfunction such as addressing a nonexistent location or resource which results in a lack of response so that the device does not continue its operation.

Another problem that arises in large, complicated systems is that after a system has been constructed, it does not operate as designed. Errors occur and the system is halted.

These problems are solved by the present invention by determining when one or two more transfers remain in an access by a device and supplies signals that permit the arbitration to be made during the last transfer so that the next device access can commence in the cycle following the last transfer by the preceding device.

The device is reset by a timer that measures the elapsed time between steps in the sequence of transferring data. Too much time between steps indicates that the device is hung up.

By selectively masking the errors from stopping the device, the system problems can be analyzed and corrected.

A device is usually controlled by a bus master that assumes control of a bus when access is granted and supplies the signals necessary to make the data transfers. In the broadest sense, the bus master is a system resource master because access to resources other than buses may be required.

Page printers are so named because they operate by composing an entire page before printing as contrasted to line printers which print a line at a time. The advantage of page printers is that graphics, images, and data can be easily composed on a single page very quickly. Page printers are usually laser types and print one hundred or more pages per minute. Page printers can also print text and images in varying orientations, i.e., in any of the four 90-degree rotations on the page to support landscape and portrait orientations as well as duplex and tumble duplex.

Storing all the text font and image data for each of the four possible orientations would require an inordinate amount of memory so logic circuits used to rotate fonts and images to the desired orientation during data transfer using the image data arranged in quads, i.e., four-by-four arrays of pels, each pel being represented by a bit.

To compose an entire page requires a large amount of memory. At 240 pels per inch resolution, an 8½-by-11 inch (A-size) page contains 5,385,600 pels. To compose one page while another is printing would require twice as much memory, viz., 10,771,200 bits at one bit per pel. To reduce memory requirements, printer control units are designed with only enough raster buffer memory to contain a small width or swath of pels to be printed on each page. As a page is printed, the swath is filled with pels for each successive portion of the page.

The swath is composed in a raster buffer, so named because the laser printhead causes the page to be printed in raster fashion. Whenever an image is larger than the swath width, the image must be subdivided into rectangular tiles that will fit in the swath buffer. (This subdivision is called tessellation.)

In accordance with the invention, a system resource master, which can be a bus master, for transferring data via a system resource such as a bus, the access to the bus being arbitrated on the basis of request signals from a plurality of bus masters, includes supplying signals to continue access to the bus by holding off arbitration of access to the bus by other bus masters. Determination that a given number of transfers remain inhibits the supplied signals so that arbitration for access to the bus can be initiated while the remaining transfers are made.

The bus master sequencer for controlling the steps involved in communicating with the bus has a timeout device for timing delays between steps controlled by the sequencer. The timeout device resets the sequencer when a predetermined time has elapsed between consecutive steps.

The sequencer is responsive to error signals for inhibiting the sequencer when an error occurs but the errors can be selectively prevented from inhibiting the sequencer.

BRIEF DESCRIPTION OF THE DRAWING

The invention is described in detail by referring to the various figures which illustrate specific embodiments of the invention, and wherein like numerals refer to like elements.

FIGS. 1A and 1B are a tabular representation of a bus master state machine.

FIG. 3 is a tabular representation of a time out state machine used in connection with a bus master state machine.

DESCRIPTION OF THE PREFERRED EMBODIMENT

Figure 2:
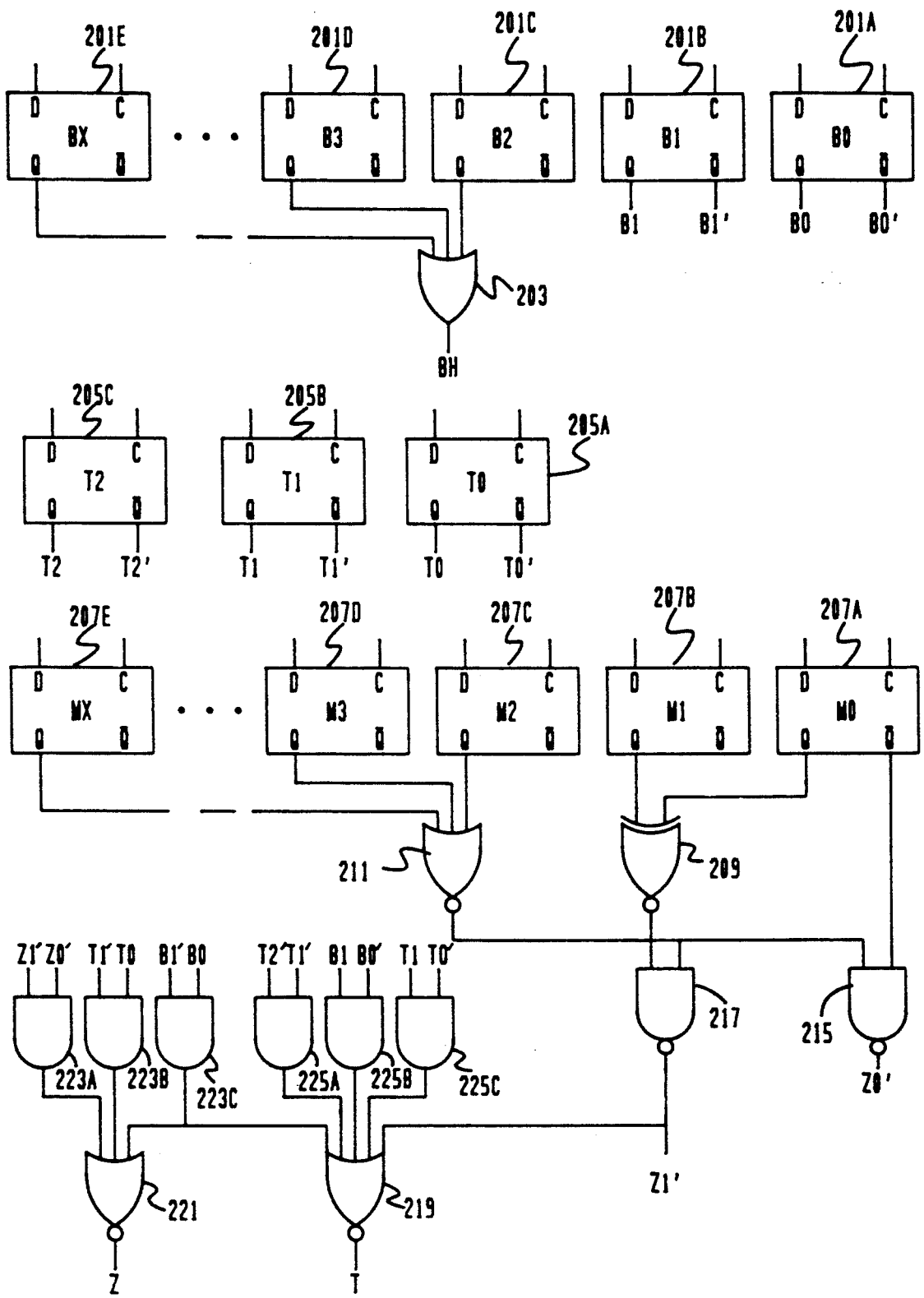
FIG. 2 is a logic diagram of registers in a DMA machine and circuits for determining the number of words remaining in a DMA data transfer.

Direct Memory Access (DMA) transfers data between devices and memories or devices without the intervention of a system processor. DMA controllers are commercially available. Some are programmable such as the Motorola MC6844. These are capable of transferring several data words during one access. When the transfer is complete, the system resource or bus is made available to other DMA controllers through an arbitration system that grants access to the system resource or bus depending on the priority of the active requests when the active DMA controller has completed its transfer operation.

A bus master is typically a DMA controller although it can be some other device such as a data transfer channel. The control portion of a bus master is a state machine in its most effective form.

A bus master state machine is represented in tabular form in FIG. 1. There are fifty conditions of interest, each represented a column in the table of FIG. 1. FIG. 1 is divided into two parts, FIG. 1A showing the first 24 columns and FIG. 1B showing columns 25 through 50. The row labels are repeated in FIG. 1B for convenience.

The top rows of the table of FIG. 1, i.e., the rows above the triple lines, represent the states and events that are the inputs to the state machine. The bottom rows, i.e., those below the triple lines, represent the actions, more exactly the signals that cause the actions.

There are eleven states, shown in rows S1 through S11. There are nine events, rows E1 through E9. The events are arranged in alphabetical order and are defined as follows.

The DMAREQ signal, shown as event E1, indicates a DMA device is requesting access to the bus, in this example the processor bus. A detailed explanation of the arbitration among more than one bus access request is set forth in the patent application Ser. No. 473,014 incorporated herein by reference. The DMAREQ signal is generated when data is to be read from or written to a memory or another device via a bus, assumed herein to be the processor bus. Patent application Ser. No. 591,355 supplies the details of one DMA communicating with another DMA. When more than one word of data is to be transferred, i.e., a burst, the DMAREQ signal is held active according to the invention until only one or two more words are to be transferred. By inactivating the DMAREQ signal in the invention before the last word is transferred, the next DMA request arbitration can be initiated without an intervening cycle during which data is not transferred, i.e., the bus is not occupied.

The MASKDMS signal, shown as event E2, is a programmable signal that permits a user to inhibit error signals that would ordinarily cause the transfer operation to terminate. The ability to mask errors is useful when a system is being designed to permit the designer to look at the errors one at a time. Certain errors are detected, e.g., addressing a nonexistent location, to prevent the state machine from hanging up in a state from which there is not exit.

The MORE signal, shown as event E3, indicates that additional words remain to be transferred during the present DMA burst.

The PBDVAL signal, shown as event E4, indicates that the data on the processor bus is valid or that there is an out-going address or data on the processor bus.

The PBHOLD signal, shown as event E5, is used during processor bus arbitration to indicate whether access to the processor bus is required in the next cycle. It is activated during address transfer by the bus master or by the data source for other cycles. This signal is deactivated during the cycle prior to the last data word transfer and is monitored by the arbitration logic to insure that the previous bus master has completed its transfer. The deactivation during the penultimate cycle precludes the need for an extra cycle for the arbitration of the next DMA request.

The READY signal, shown as event E6, indicates that data is ready. When the data transfer is a read operation, it indicates that the data can be latched from the processor bus. During a write operation, it means the data is ready for transfer to the processor bus.

The START signal, shown as event E7, indicates that a DMA request or a DMA burst request has been granted to the DMA bus master that is the state machine under consideration, i.e., the state machine depicted in FIG. 1.

The STRBUSY signal, shown as event E8, indicates the processor bus is occupied in storing or loading data and that data should be resent during the next cycle.

The STRLOAD signal, shown as event E9, indicates the direction of data transfer relative to the bus master under consideration. The signal is active if the data transfer is a read operation and inactive if a write operation.

The table of FIG. 1 is interpreted as logically ANDing the values of the state and event entries in each column. A '1' entry indicates the signal is active and a '0' entry indicates the signal is inactive. A blank entry indicates a don't-care value, i.e, the variable (state or event) does not affect the output signal. A state variable always has a value of '1' because the actions are generated during a state and not during the absence of a state.

The actions, A1 through A11, select the next state and are apparent from an examination of the table. The actions are activated where indicated by an X entry. Where an action is caused by more than one set of input variables, i.e., it has an X in more than one column, and the output of the AND gates implicit for each column of input variables are considered to be ORed for that action.

The action A12, P-BUS ADDR, places the address of the data transfer on the processor bus. The address may that of a memory location or another device.

The action A13, P-BUS DATA, places the data to be transferred on the processor bus.

The remaining actions A14 through A17 are the same as the input variables of the same name. The action A15, STRLOAD, is shown in FIG. 1A and the action A17, PBHOLD, is shown in FIG. 1B. The rows occupied by these actions would otherwise be blank in the other figure.

State A is the initial or idle state. When the START input variable is '0' during state A, i.e., START=0, the only action is to select state A. When both the DMAREQ and MASKDMS signals are inactive during state A, i.e., DMAREQ=0 and MASKDMS=0, the only action is to select state A. Therefore, state A under the above is selected according to the logic equation A & (START' v DMAREQ' & MASKDMS') where & represents logical AND, v represents logical OR, and ' represents negation or logical NOT. These two conditions are set forth in columns 1 and 2 of the table.

When there is both an active DMAREQ and an active START signal during state A, i.e., A & DMAREQ & START, state C is selected. Additionally, actions A12 through A16 are initiated. That is, the transfer address is put on the processor bus, the signals PBDVAL and STRLOAD are activated, and the DMAREQ signal is maintained. State C is a DMA start state.

In state C, if the STRLOAD signal is active, the data transfer is a read operation. As shown in column 41, this causes state J to be selected as the next state. This is a dummy read state because the data cannot be ready for latching from the bus during the first cycle.

In state C, if the STRLOAD signal is inactive, then the data transfer is a write operation and the next state selected is state E if the data is ready (READY=1) or state G if the data is not ready (READY=0). State E is a DMA write state and state G is a wait state.

From state G, the machine transits to state H, another wait state. Both wait states G and H raise the PBHOLD signal to hold off the next arbitration and the DMAREQ signal to continue in the burst mode.

From the state H, the machine selects state F as the next state. If the STRBUSY signal is active, the F state selects the H state again if the data is not ready to write as indicated by the READY signal inactive or the F state again if the data is ready to write, i.e., the READY signal is active.

If the STRBUSY signal is inactive, the processor bus address counter is incremented and a burst length counter and a DMA move length counter are decremented. The number of words to be moved during a bus access is determined by three registers, two of which are the burst counter and the DMA move counter. They are discussed in more detail below.

If there is more data in the burst as signaled by the MORE signal, the above cycle is repeated. Otherwise, the next state selected is the B state if the START, DMAREQ, and MASKDMS signals are inactive. This condition means that the bus master under consideration will not gain control of the bus during the next arbitration. If the START signal and either the DMAREQ or MASKDMS signals are active, then the next state is state D which, like state C, is a start DMA cycle state.

State D selects state G or state E if STRLOAD is inactive, signifying a write operation and the above-described write operation is continued.

The read operation goes through state J as previously described and selects state K. State K is the read loop state and increments the processor bus address counter, decrements the burst and DMA move length counters, and latches the data from the processor bus. When no more data is to be transferred in the burst, the next state selected is state A if the next bus grant is not requested or supplied and the state C otherwise.

The above description of the state flow, except for the following differences, is a usual sequence of operations carried out by a DMA data transfer. The inclusion of the MASKDMS signal permits the designer of a system using the state machine according to the invention to debug a system by isolating problems.

The prior art DMA transfers keep the PBHOLD and DMAREQ (or their equivalent) signals active until the data transfer is completed. This insures that all the data is successfully moved but requires another cycle to arbitrate the next bus access. The bus is idle during this cycle. The invention overlaps the arbitration cycle with the transfer of the last word in the DMA operation.

A feature of the invention, therefore, is the determination of the number of words left to be transferred in a DMA burst. In columns 25 through 32, the PBHOLD action, A17, has the entry Z as does the DMAREQ, A16, in columns 41, 42, 49, and 50. This notation denotes that the signal is raised or maintained if a Z signal is present.

Columns 43 through 48 show that the DMAREQ signal is maintained if a T signal is present. As will be explained below in detail, the Z signal is generated when two or more words are left to be transferred in the present DMA burst and the T signal is generated when three or more words remain to be transferred in the present DMA burst.

If two or more words remain to be transferred when state E or state F, both DMA write states, are selected as the next state, the PBHOLD signal is raised to hold off arbitration of the next request for access to the processor bus. When only one word remains to be transferred, the Z signal is inactive so the PBHOLD signal is not raised and the bus arbitration logic can initiate the grant of the next access to the processor bus. The next DMA bus master can therefore take control of the bus faster than is possible with prior art systems because the cycle usually required for sensing the completion of the previous transfer is overlapped with the transfer of the last word in the preceding burst transfer.

When next state selected is state J, the dummy read state, or state L, the more-than-one word state, the DMAREQ signal is maintained to request continued access to the bus when the Z signal is present indicating that two or more words are to be transferred. When the Z signal is inactive, the DMAREQ signal is not raised to permit the arbitration logic to initiate the next arbitration sequence by not requesting an additional, unnecessary burst cycle.

As noted above, three counters control the number of words moved during a DMA transfer operation, two of which are the burst length and DMA move counters. The third counter is the tessellation length counter. The tessellation operation is described in detail in the patent application Ser. No. 591,354 incorporated herein by reference. The tessellation length has a maximum value of four. When tessellation is not to be performed, the tessellation length counter is initialized to the value of zero. The burst length and DMA move length counters can have any reasonable maximum length, usually 16 or 32 bits. These are considered, in the preferred embodiment, to be programmable registers.

The DMA move length is initially set to the total number of words to be transferred, a word being determined by the width of the bus. The total move length is a function of the application. The burst length register is set to the number of words to be sent in a single burst. The latter permits a large move length to be divided into multiword bursts that utilize the system most effectively without hogging the system to complete the entire move in a single burst. Being programmable, the optimal burst length can be empirically determined for a particular system configuration. An arbitration scheme compatible with this capability is described in the patent application Ser. No. 473,014 incorporated herein by reference.

FIG. 2 is a block diagram showing the burst length counter B0 to BX, the tessellation counter T0 to T2, and the DMA move counter M0 to MX. The B0, T0, and M0 registers are the least significant bits of the counters. BX, T2, and MX registers are the most significant bits of the counters.

When tessellating, a maximum of four words is moved from successive addresses. Therefore, a new DMA request is required to set up the new address for each tessellation scan.

When transferring data words, the counters are decremented as previously described. Therefore, the burst length counter 201 contains the remaining number of words to be transferred in the burst. The tessellation counter 205 contains the remaining number of words to be transferred during the present bus grant if tessellating. The DMA move length counter 207 contains the number of data words remaining to be moved.

The number of data words to be moved in the present access is a nonobvious, complicated combination of variables. For example, if the remaining move length in counter 207 is four or more, a remaining burst length of one in the counter 201 or in the tessellation counter 205 is controlling. The variables are remaining move values of one, two, three, or more than three in the DMA move counter 207; remaining burst lengths of zero, one, two, three, or more than three; and remaining tessellation lengths of zero, one, two, three, or four.

In FIG. 2, a NOR gate 211 supplies a low output signal whenever the move counter stages 207C or higher are set. That is, a low signal from the NOR gate 211 indicates that the move counter 207 contains a value of four or more, i.e., more than three. A logic network comprising an EXCLUSIVE-NOR gate 209 and two NAND gates 215 and 217 performs a transformation of variables when the move counter contains a value less than four. The output signal from the NAND gate 217, Z1', and from the NAND gate 215, Z0', supply a binary count as follows: Z1 and Z0 indicates more than three; Z1 and Z0' indicates three; Z1' and Z0 indicates two; and Z1' and Z0' indicates one.

An OR gate 203 supplies a signal indicating that the high order stages of the burst length counter are not zero, i.e., the counter contains four or more.

A triplet of AND gates 223A-223C decodes the counter contents and supplies signals to a NOR gate 221 when only one more word remains to be moved during the present DMA transfer. The NOR gate 221 therefore supplies an active (high) signal, Z, when more than one word remains to be moved.

Another triplet of AND gates 225A-225C, the Z1' output signal from the NAND gate 217, and the output signal from the AND gate 223C supply input signals to a NOR gate 219 when one or two words remain to be transferred in the present DMA operation. The output signal is inverted so that the NOR gate 219 supplies an active output signal, T, when three or more words remain to be moved in the DMA transfer.

The Z and T signals are supplied to the bus master state machine to raise the PBHOLD and DMAREQ signals as described above.

The table of FIG. 3 depicts a time out state machine. In the preferred embodiment, a time out state machine is associated with each bus master. The state machine of FIG. 3 is interpreted in the same manner as that of FIG. 1. The new signals are events E4 (PBDREQX), E7 (STRREQ), and E8 (STRREQ2).

The PBDREQX signal indicates there is a request for access to the bus. It is described in detail in patent application Ser. No. 473,014 incorporated herein by reference. The STRREQ signal is used to request a storage cycle by controlling the processor bus. The STRREQ2 signal also is used to access the bus but to communicate with another DMA device without processor intervention as described in the patent application Ser. No. 591,355 incorporated herein by reference.

The MYDMA signal is used to identify that the signals being monitored are from the bus master state machine with which the time out state machine is associated.

A count-down counter is loaded with a value that determines the time out interval which may be in the range of four to fifty milliseconds. Free running, linear feedback shift registers can be used to generate the clock signals that decrement the count-down counters which can be two-bit counters when using the LFSR clocks. When the counter reaches zero, a zero detect circuit supplies a signal that resets its associated bus master state machine to its idle state and removes the signals from the bus. The signal may also set an error indication, cause an interrupt, or initiate some similar event to signal that the bus master state machine has stalled.

The counter is loaded by action A7 which effectively resets the time out counter. The counter is decremented by action A8.

State B times the period from a DMAREQ from the associated bus master to the time a PDBREQX signal is generated. If the counter is decremented to zero, it means that the DMAREQ was never received by the arbitration. It makes no difference that the PDBREQX signal is from another bus master; it means that there has been a response to a DMAREQ signal.

State C times the period from the access grant to the STRREQ or STRREQ2 signal. These signals indicate the access grant is being used by a DMA bus master.

State F times the period the bus slave takes to respond to the associated bus master signals.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. An arbitration system comprising:

resource means;

resource arbiter means for controlling access to the resource means by arbitrating requests therefor; and a plurality of resource masters, each resource master including means for supplying to said resource arbiter means signals representing requests for access to the resource means, sequencing means for controlling steps in communicating with the resource means, means for supplying signals to the resource arbiter when access to the resource means is attained to retain access to the resource means by preventing arbitration of other access requests to the resource means, means for determining that a given number of transfers remain, said given number being determined from the total number of transfers to be made and the total number of transfers to be made consecutively, and means responsive to said determining means for inhibiting signals from the signal supplying means.

2. The arbitration system claimed in claim 1 wherein said given number is further determined from the number of scans required for tessellation.

3. The arbitration system as claimed in claim 1 wherein each resource master further includes timeout means for timing delays between steps controlled by said sequencing means, and means responsive to said timeout means for resetting said sequencing means when a predetermined time has elapsed between consecutive steps.

4. The arbitration system as claimed in claim 1 wherein each resource master further includes means responsive to error signals for inhibiting said sequencing means when an error occurs, and means for selectively inhibiting said error responsive means for inhibiting said sequencing means.

* * * * *